United States Patent [19]

Brandt, Jr.

[11] 4,375,769

[45] Mar. 8, 1983

[54] TRANSVERSE-DUCT INSERTION TYPE PRESSURE AVERAGING PRIMARY

[75] Inventor: Robert O. Brandt, Jr., Garner, N.C.

[73] Assignee: Brandt Industries, Inc., Fuquay, N.C.

[21] Appl. No.: 280,790

[22] Filed: Jul. 6, 1981

[51] Int. Cl.³ .............................................. G01F 1/46
[52] U.S. Cl. .................................................. 73/861.66
[58] Field of Search ............ 73/861.65, 861.66, 861.42

[56] References Cited

U.S. PATENT DOCUMENTS 3,765,241 10/1973 Lambert ........................... 73/861.66
4,036,054 7/1977 Goulet .............................. 73/861.66

*Primary Examiner*—James J. Gill
*Attorney, Agent, or Firm*—Mills & Coats

[57] ABSTRACT

The present invention entails a transverse type pressure averaging primary device that is designed to be mounted within a duct and designed to sense both total and static pressures of fluid flow passing within the duct. More particularly, the pressure averaging primary system of the present invention includes high and low pressure lines that extend transversely across the duct and which generally includes multiple pressure sensing points along the lines for sensing both total and static pressure. In the case of the high pressure line, the respective total pressure sensing points thereof are appropriately confined within cylindrical shrouds. Selected cylindrical shrouds include extensions that extend to and are secured to the low or static pressure line for structurally integrating and reinforcing the spans of the high and low pressure lines.

5 Claims, 3 Drawing Figures

TRANSVERSE-DUCT INSERTION TYPE PRESSURE AVERAGING PRIMARY

FIELD OF INVENTION

The present invention relates to fluid pressure sensing devices and to averaging pressure primaries for the multi-point sensing and averaging of both total and static pressure fluid flow within a duct. More particularly, the present pressure averaging primary is of the insertion-transverse type adapted to be inserted within a duct and to sense multi-pressure points along the span of both high and low pressure lines.

BACKGROUND OF INVENTION

For many years the main approach to measuring flow in a gas or air stream was with a device referred to as a pitot. Typically the pitot was provided with two pressure openings—one for measuring the static pressure and one for measuring total pressure which included the combined static and velocity pressure. As is well appreciated and known in the industry, the single pitot approach has serious shortcomings. Among such shortcomings is the fact that the design only effectively indicates velocity at one point in the flow stream. In order to achieve more accurate readings with a single pitot tube, it has been necessary to scan the flow stream with the pitot and to average the readings taken at selected points. However, this approach is not withouts its difficulties. To even scan the flow stream requires a traversing drive mechanism for the pitot. In addition, the pitot must be maintained in a proper position with respect to the moving air or gas of the flow stream. Coupled to this is the problem of the pitots tendency to become clogged or plugged with foreign material passing within the stream of flow, especially in industrial type applications. Thusly it can be said that the single pitot has never been really effective enough to become widely accepted in industry and used in industrial installations. Of late, however, the industry has seen the emergence of averaging pitot systems that are specifically designed to sense and average both total and static pressure over the entire cross section of the duct housing the passing flow. These systems generally include multibranches disposed about the cross section of the duct and wherein the respective branches are provided with multi-pressure sensing points, either the port or pitot type, for averaging both static and total pressure of the fluid passing within the system. One is referred to the disclosures found in U.S. Pat. Nos. 3,685,355; 4,036,054; and 3,981,193 for a more complete and unified understanding of basic approaches to pressure averaging primaries.

Generally, the pressure averaging primaries referred to above are designed and fabricated within a containing duct which is mounted or inserted within an existing duct at the site of installation.

In addition the pressure averaging primaries of the prior art has not been totally suited from a design standpoint, for very large duct applications. Heretobefore, situations with very large duct designs have required that the pressure averaging primary be completely custom designed and manufactured. Obviously this is expensive and requires a substantial amount of design and manufacturing time.

Therefore, there has been and continues to be a need for a pressure averaging primary of a basic production type design that is relatively simple and inexpensive and which can be easily and conveniently retrofitted to an existing duct.

SUMMARY OF THE INVENTION

The present invention entails an insertion-transverse multi-point pressure averaging primary that is designed to be retrofitted into an existing duct. More particularly, the present pressure averaging primary comprsises two transverse pressure lines, referred to as high and low lines. High and low pressure lines extend from a mounting plate about one end that is secured to a duct structure and are supported about the other end by a connector that is adapted to be secured within the duct. Selectively spaced along both the high and low pressure lines are a series of pressure sensing points in the form of openings or ports in the alternative conventional pitot tubes. Each sensing point about the high pressure line includes a surrounding cylindrical shroud. Selected shrouds are provided with structural extensions that extend to actually connect to the low pressure line to provide substantial structural rigidity to the span of high and low pressure lines, enabling the reslting insertion-transverse primary to be constructed and fabricated economically.

It is, therefore, an object of the present invention to provide an insertion-transverse pressure averaging primary for sensing both static and total pressure within a fluid flow stream.

A further object of the present invention resides in the provision of a pressure averaging primary of the insertion-transverse type that is provided with high and low pressure lines that extend across the duct and which are provided with structural reinforcing means interconnecting the respective lines such that the size of the respective lines may be minimized while still providing a span of substantial structural integrity.

A further object of the present invention is to provide an insertion-transverse type pressure averaging primary of the character referred to above wherein pressure sensing ports formed in said high pressure lines are each surrounded by cylindrical shroud and wherein each shroud is provided with an integrally formed extension that structurally connects said low pressure line and serves to structurally interconnected the high and low pressure lines of said primary to form a structurally rigid high and low pressure line span.

Still a further object of the present invention is to provide a practical and economical design for an insertion-transverse type primary of the character referred to above that has the capability of extending over a substantial span without base support between opposite supported ends.

Another object of the present invention resides in the provision of an insertion-transverse type pressure averaging primary of the character referred to above wherein the basic design serves for a wide range of duct span applications.

Other objects and advantages of the present invention will become apparent from a study of the following description and the accompanying drawings which are merely illustrative of the present invention.

INSERTION-TRANSVERSING TYPE PRESSURE AVERAGING PRIMARY

Figure 1:
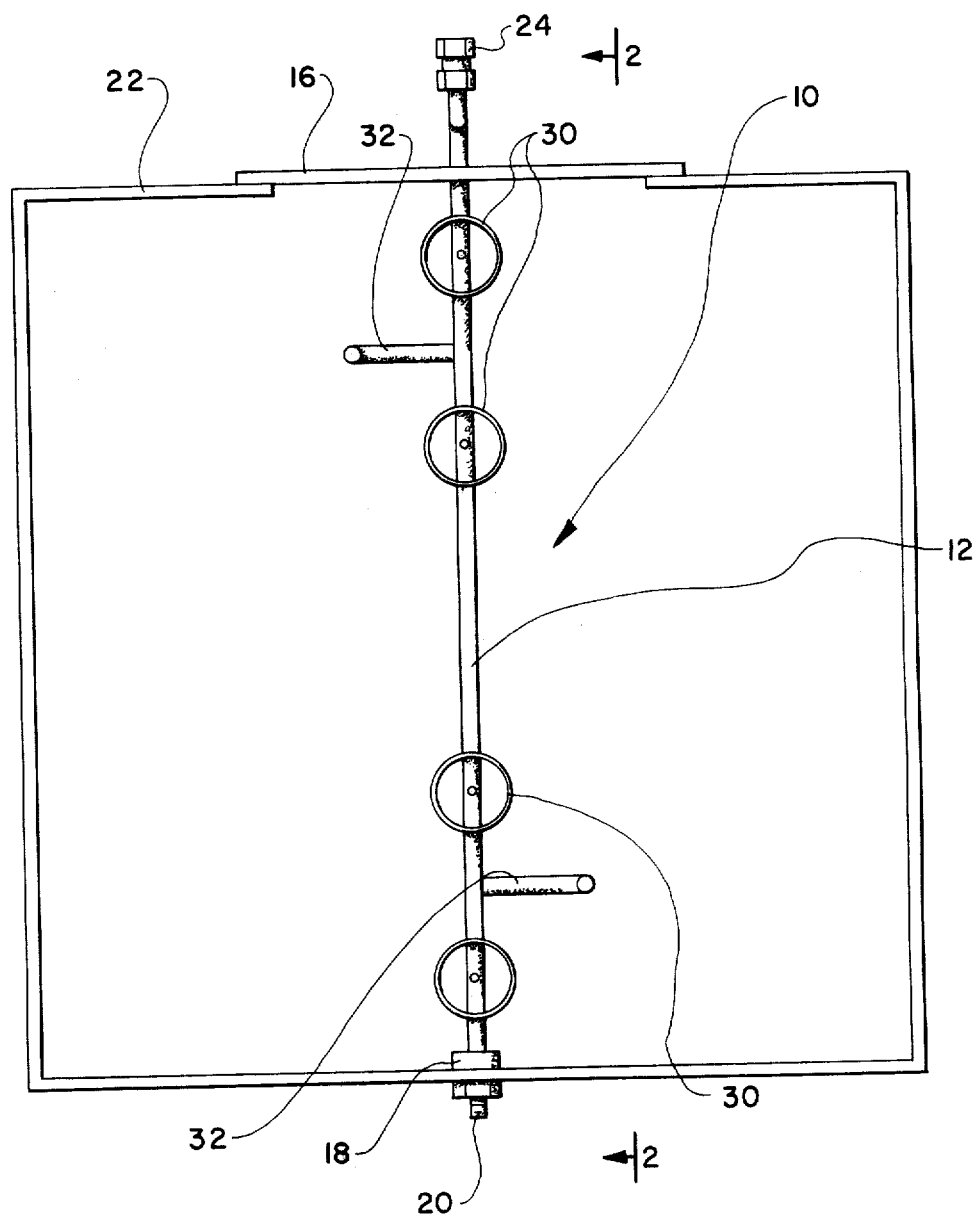
FIG. 1 is a cross sectional view of a duct structure containing the insertion type pressure averaging primary of the present invention with the primary being viewed from upstream.

With further reference to the drawings, the pressure averaging primary of the present invention is shown therein and indicated generally by the numeral 10. Pressure averaging primary 10 is of the insertion-transverse type in that the same is designed to be retrofitted to an existing duct. As will be more fully understood from subsequent portions of this disclosure, averaging primary 10 is designed to be inserted within an existing duct and secured in a transverse fashion across the duct to the actual structure of the duct itself. In the present disclosure, averaging primary 10 is shown mounted within a duct 22 which could be round, rectangular, or square in cross section, or could also be of other cross sectional configurations.

Turning now to a discussion of the insertion transverse averaging primary 10 of the present invention, it is seen that the same includes two pressure lines, one referred to as a high pressure line 12 and another referred to as a low pressure line 14. High and low pressure lines 12 and 14 are secured within a side mounting plate 16 that is designed to be secured to an existing duct 22. Once side mounting plate 16 is secured to duct 22, it is seen that the high and low pressure lines 12 and 14 extend transversely across duct 22 to where the primary is provided with a mounting block 18 secured to the opposite ends of lines 12 and 14. Secured to mounting block 18 and extending therefrom is a support or securing stud 20 that is threaded and designed to extend through an opening within duct 22 where the remote end thereof may receive a nut or other type of securing means such that the end of the primary 10 adjacent mounting block 18 can be securely held within the duct.

Figure 2:
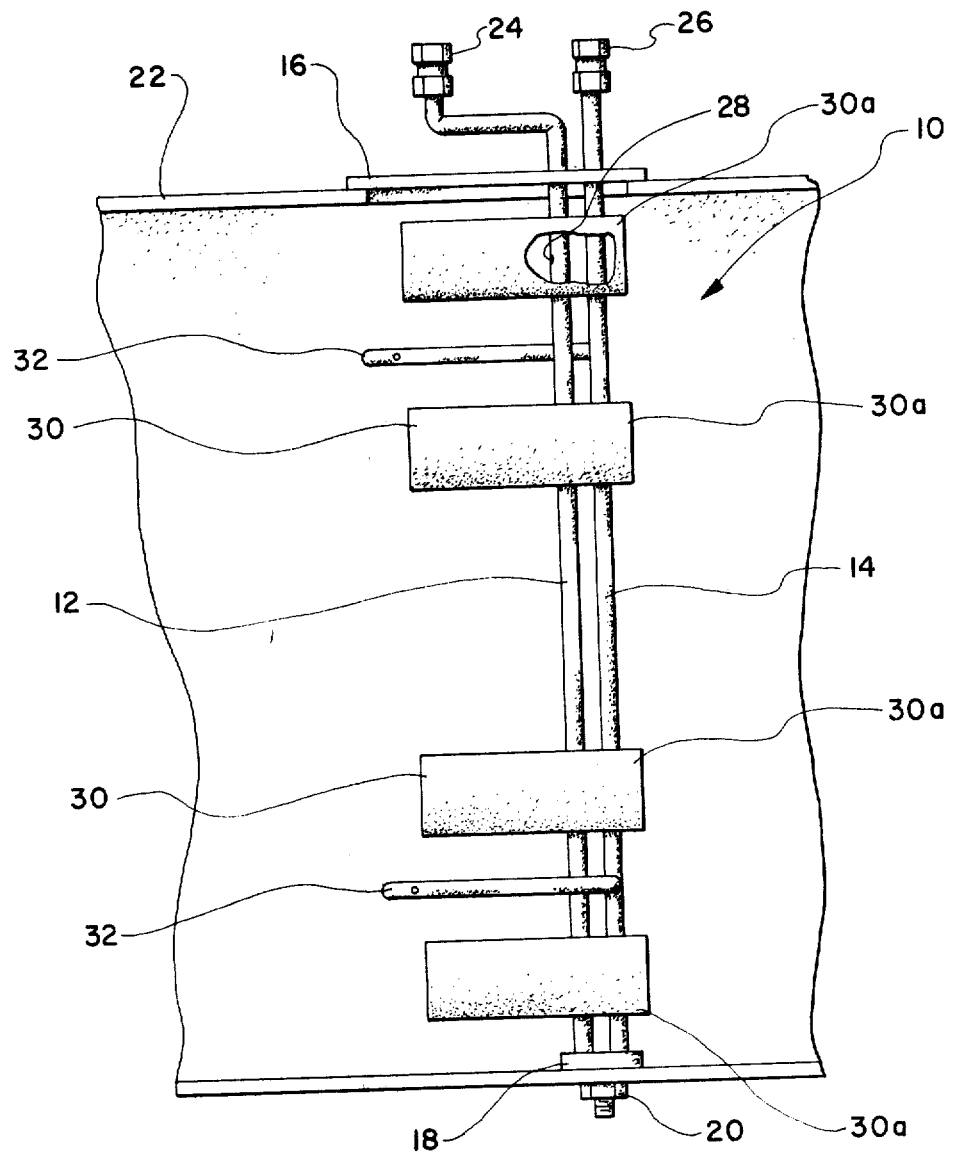
FIG. 2 is a sectional view taken along the lines 2—2 in FIG. 1.
Figure 3:
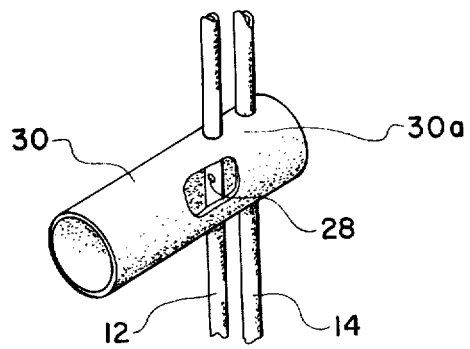
FIG. 3 is a fragmentary perspective view of a single shroud and its integrally formed extension that connects to a low pressure line of the primary.

As seen in FIGS. 1 and 2, each high and low pressure lines 12 and 14 include an exiting end that extends outwardly from side mounting plate 16. Each exiting end of the respective lines 12 and 14 include exiting fittings 24 and 26.

Therefore, as seen in the drawings, when properly retrofitted to an existing duct 22, the pressure averaging primary 22 of the present invention includes the high and low pressure lines 12 and 14 extending transversely across the duct 22 and supported at opposite ends by the duct itself.

Viewing high pressure line 12, it should be pointed out that this line is designed to sense total pressure of fluid flow flowing in the duct 22. Total pressure includes the combined static and velocity pressure of the fluid flow. To sense total pressure at multi-spaced points across high pressure line 12, there is provided a series of total pressure sensing ports 28 formed at selected spaced intervals along the high pressure line 12. Each high pressure sensing port is formed at a normal angle to the flow of fluid within duct 22. That is the opening or port 28 is provided such that the same directly faces oncoming flow.

With respect to the low pressure line 14, this line is designed to sense static pressure of fluid flow and in cases of multi-point sensing, to average the same. In the present disclosure, there is provided a plurality of static pressure sensing points in the form of pitots 32. The pitots 32 include static pressure sensing openings that generally lie parallel to the direction of fluid flow within duct 22 in order that the static pressure is not significantly influenced by velocity pressure.

Formed about each total pressure receiving port 28 is a Kiel shroud 30 that is secured about high pressure line 12. Each Kiel shroud is generally a hollow cylindrical housing that receives high pressure line 12 therethrough and which is generally aligned with the direction of flow such that fluid flow can pass directly therethrough into contact with the shrouded total pressure receiving port 28.

To make the present primary practical and economical, it is desirable to maintain the same as a relatively lightweight primary. To accomplish this and to give the primary the capability to extend over substantially spans, the shrouds 30 are provided with shroud extensions 38 that extend from the shroud and join the low pressure line 14 where the same is secured by weldment or other suitable means thereto. This effectively links in a truss fashion the high and low pressure lines throughout the respective spans of the pressure averaging primary 10. This enables pressure averaging primary 10 to be of a practical and very economical structural design, but yet allows the high and low pressure lines 12 and 14 to span the entire duct 22 without base structural support between the opposite supported ends that are supported by side mounting plates 16 on the one hand and the mounting block 18 and threaded stud 20 on the other hand.

As illustrated in this disclosure, pressure averaging primary 10 of the present invention can be designed to be used in conjunction with round ducts or rectangular or square ducts. For a round or cylindrical duct, side mounting plate 16 would be of a corresponding arcuate configuration in order that the same can be secured by bolts, weldment or other suitable means directly to the duct 22. Likewise, as illustrated in FIG. 1, in the event the duct is rectangular or square, the side mounting plate 18 would generally be flat. Also it is appreciated that the pressure receiving point on both the high and low pressure line would be particularly placed such that the respective pressure would be appropriately averaged.

In the case of a cylindrical cross section, it is appreciated by those skilled in the art, that certain points within the cross section can be sensed for total pressure and appropriately averaged to give an average flow. In the species shown in FIG. 1, the total pressure is sensed at 4 points within the duct and appropriately averaged by the high pressure line.

Static pressure, on the other hand, is sensed at 2 points, each point being between two total pressure sensed points, and likewise averaged. The resulting pressure signals are transferred through the respective lines 12 and 14 where they may enter appropriate instrumentation such as a differential pressure transmitter that would be connected to the exit fittings 24 and 26. Details of the differential pressure transmitter and other related subject matter is not dealt with herein in detail because such is not material to the present invention and in addition, such is already known and appreciated by those skilled in the art.

From the foregoing it is seen that the insertion-transverse pressure averaging primary of the present invention has substantial advantage over the prior art for certain applications. More particularly, the averaging primary of the present invention is relatively simple and inexpensive and can be utilized within existing duct to span the entire duct and to average both total and static pressure at various points across its span. More particularly, the present invention entails a basic design that can be manufactured and used in ducts having a wide range in span lengths.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An elongated transverse type pressure averaging primary system adapted to be inserted and mounted transversely within an air duct for sensing both total and static pressure of fluid flow within the duct, said pressure averaging primary system comprising: mounting plate means having inner and outer faces adapted to be connected to said duct; an elongated high pressure line secured to said mounting plate means and extending from said inner face of said mounting plate outwardly therefrom towards an opposite wall of said duct where said high pressure line includes a closed terminal end opposite said mounted plate means, said high pressure line further including an exiting opening opposite said closed terminal end; an elongated low pressure line secured to said mounting plate means and extending outwardly therefrom towards an opposite wall of said duct where the same includes a closed terminal end opposite said mounting plate means, said low pressure line further including an exiting opening opposite said closed terminal end; total pressure port means selectively spaced along said elongated high pressure line and communicatively connected therewith such that said port means acts to sense total pressure at selected points along said high pressure line such that the pressure signal emitted from said exiting end of said elongated high pressure line generally represents the average total pressure sensed by said total pressure port means; static pressure sensing means associated with said low pressure line and communicatively connected therewith for sensing static pressure of the fluid flow passing within said duct such that the pressure signal emitted from said exiting end of said low pressure line is representative of the static pressure of the fluid flow within said duct; support means associated with the end of said pressure averaging primary system opposite said mounting plate means for operatively connecting said primary system to said duct opposite the connection of said mounting plate means; interconnecting reenforcing means interconnecting said high and low pressure lines at selected points along their span; said interconnecting reenforcing means including shroud means secured to said high pressure line about selected port means formed therein so as to shroud and protect the respective port means; and wherein said shroud means includes extension means integrally formed therewith and extending therefrom for extending to said low pressure line and connecting therewith for structurally reenforcing said elongated insertion type primary and for directly coupling said high and low pressure lines together so as to form a rigid structure throughout the span of said primary system.

2. The averaging primary system of claim 1 wherein said shroud means includes a hollow cylinder having two opposite open ends and wherein there is provided two sets of vertically spaced openings formed in said cylinder, each set of openings including two horizontally aligned openings for receiving a respective high or low pressure line.

3. The averaging primary system of claim 2 wherein said support means associated with the end of said primary system opposite said mounting plate means includes an elongated stud that is adapted to extend through a portion of the wall structure of said duct for supporting the end thereof opposite said mounting plate means.

4. The averaging primary system of claim 1 wherein said static pressure sensing means includes at least one static pitot communicatively connected to said low pressure line and extending therefrom and further including a static pressure opening that is formed in said static pitot such that the same is oriented such that the plane of said static opening lies generally parallel to fluid flow within duct.

5. The averaging primary system of claim 4 wherein said high and low pressure lines are disposed one over the other and extend generally in parallel relationship once said primary system is mounted within said duct.

* * * * *